United States Patent

[11] 3,617,858

| [72] | Inventor | Edward G. Oder, Jr.<br>Sulphur Springs, Tex. |
|---|---|---|
| [21] | Appl. No. | 839,307 |
| [22] | Filed | July 7, 1969 |
| [45] | Patented | Nov. 2, 1971 |
| [73] | Assignee | Warren Petroleum Corporation<br>Tulsa, Okla. |

[54] EXCITATION OF ALTERNATING CURRENT MACHINERY
10 Claims, 4 Drawing Figs.

[52] U.S. Cl. .................................... 322/76,
322/80, 323/48, 323/56, 336/212, 336/215
[51] Int. Cl. ........................................... H02p 9/32
[50] Field of Search ............................. 322/95, 96,
97, 75, 76, 80; 336/215, 212; 323/48, 56, 57, 60

[56] References Cited
UNITED STATES PATENTS

| 1,376,978 | 5/1921 | Stoekle | 336/215 X |
| 1,779,269 | 10/1930 | Clough | 336/215 X |
| 3,140,437 | 7/1964 | Bretch | 322/75 |
| 3,249,846 | 5/1966 | Steinbruegge et al. | 322/28 |
| 3,242,419 | 3/1966 | Walburn | 323/56 |

Primary Examiner—T. E. Lynch
Assistant Examiner—H. Huberfeld
Attorneys—Meyer Neishloss, Deane E. Keith and William Kovensky ABSTRACT: An excitation and control system for heavy-duty electricity generating machines wherein a single-transformer and rectifying means is provided to serve all control purposes. The transformer is provided with an arm for each phase which carries a control coil tapped into the rectifying means. By manually adjusting a rheostat, saturation of the transformer core between the primary and secondary coils is controlled to finely control output voltage. The entire system has no moving parts and may be sealed.

INVENTOR.
EDWARD G. ODER, JR.

EXCITATION OF ALTERNATING CURRENT MACHINERY

This invention pertains to electromagnetic machinery, and in particular it is directed to an improved system for exciting relatively large alternating current generators and to finely control the voltage produced by such generators. An improved transformer core is also provided.

In installations where relatively large amounts of electricity are generated, the relatively large electrical machines used require external excitation of the generators for startup. Heretofore, this excitation current was most frequently provided by a small direct current generator. The present invention provides an improved excitation system for such machines which eliminates the small separate DC generator heretofore required, along with the separate automatic voltage regulator associated therewith.

The invention includes no moving parts, and therefore has no potential of generating sparks and may be easily made explosion proof. The apparatus of the invention may be easily sealed, as by being encapsulated, or by being provided with a suitable sealed enclosure. The absence of moving parts and the sealed structure is an important advantage of the invention over the separate generator heretofore used in that such separate small generators are very vulnerable to break down in inhospitable environments. The various moving parts, which are open to atmosphere for cooling purposes, are subject to breakdown from heat, vibration, and debris and corrosive substances in the air. The invention eliminates all of these sources of breakdown in that it is sealed and has no moving parts.

The invention also provides means to finely control the output voltage, and the ability to do so while the machine is running. This portion of the invention utilizes a variably saturable transformer core, and provides an additional control coil on an arm of the transformer core disposed so as to effect the magnetic flux in the core between the primary and secondary coils. Heretofore, it was known to vary the capacity or saturability of the transformer core by physically removing or adding iron pieces or laminations in the core. Obviously, such a scheme suffers from the disadvantage that the machine must be shut down and access must be had to the transformer core itself. In the present invention, the core saturation controlling coils may be sealed with the remainder of the transformer, and remotely controlled, manually by a rheostat or the like, while the machine continues to operate without interruption.

The invention is not limited to use with any particular electrical conditions, that is, it may be single phase, or poly phase, at all frequencies, and at all voltages.

The above and other advantages of the invention will be pointed out or will become evident in the following detailed description and claims, and in the accompanying drawing also forming a part of the disclosure, in which:

FIG. 2a is a diagrammatic explanation of part of FIG. 2; and

Figure 1:
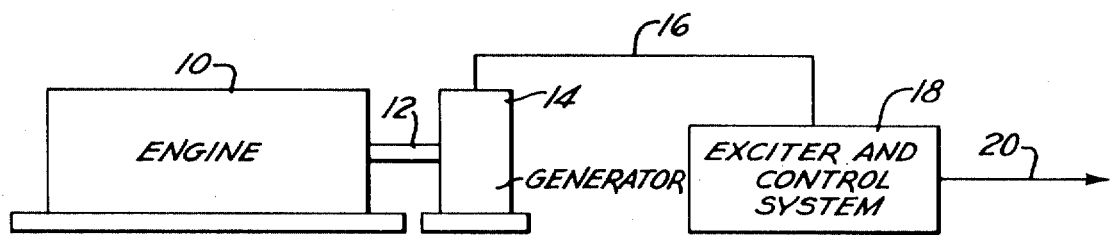
FIG. 1 is a schematic showing of an electricity generating installation utilizing the exciter of the invention.

Referring to FIG. 1, there is shown a prime mover 10 which is directly coupled by a shaft 12 to a synchronous generator 14. A cable 16 electrically connects generator 14 to the exciter and control system 18 of the invention. The electricity is delivered for use from system 18 via a cable 20. The cable 16 and 20 each contain a plurality of conductors, as is known to those skilled in the art, and as will be further set forth in the detailed description of FIG. 2 below.

In the particular installation in which it is anticipated an embodiment of the invention will be built and used, prime mover 10 is an Ingersall-Rand 10 cylinder type PSVG natural gas engine developing 680 H.P. at 514 r.p.m. Generator 14 is an Electrical Machinery Manufacturing Company three-phase 600 kva., 60 cycle synchronous generator developing 144 Amps at 2,400 volts and 514 r.p.m.

Figure 2:
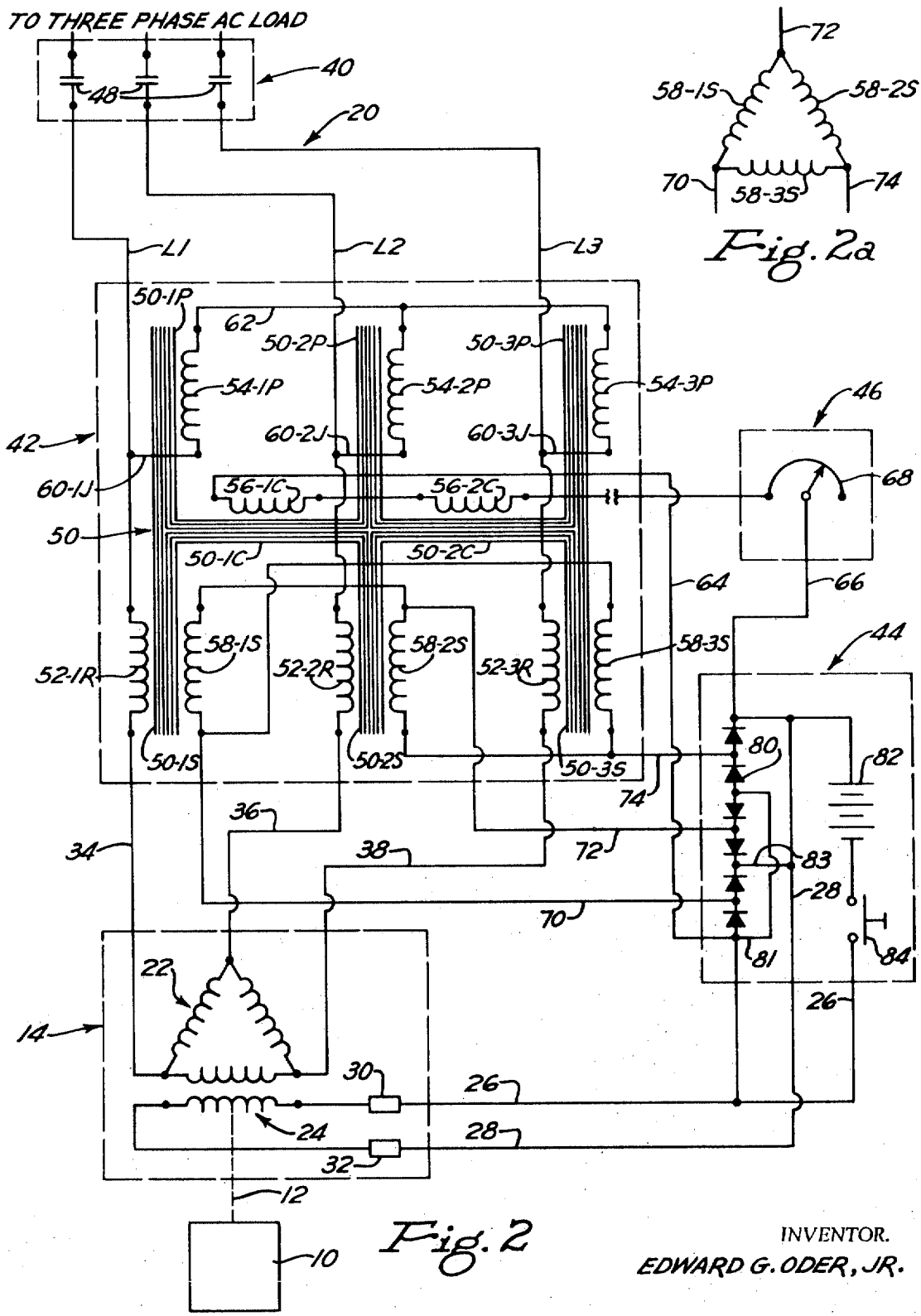
FIG. 2 is an electrical schematic diagram thereof.

Referring now to FIG. 2, the overall system is shown schematically. Generator 14 includes a three-phase stator or stationary portion 22 and a three-phase rotor or moving portion 24. Engine 10 and the mechanical coupling between it and rotor 24 are indicated diagrammatically. The generator rotor 24 is connected by a pair of lines 26 and 28 into the remainder of the control system 18. A pair of slip rings 30 and 32 is included in said lines, respectively, in the usual manner. Generator 14 and its manner of connection is otherwise conventional and no further detail is shown. Three lines 34, 36 and 38 connect stator 22 to the remainder of the control system.

The remainder of the control system 18 of the invention may be broken down, for the purpose of ease of explanation, into four portions. These portions are a main disconnect 40 on the output lines L1, L2, and L3, a transformer portion 42, a direct current portion 44, and a transformer saturation controlling portion 46.

Disconnect 40 may comprise the usual heavy-duty main switch between the load, power grid or point of use on one side, and the generating system, and includes an individual pair of contacts 48 for each of the three lines L1, L2, and L3. Disconnect 40 may be a Class 726 circuit breaker manufactured by the Nelson Electric Manufacturing Co.

The system shown is three-phase, but it may be thought of as a triplication of one phase. Along this same line of reasoning, the invention is also applicable for use with a single-phase electrical system, or a polyphase system having more or less than three-phases.

Figure 3:
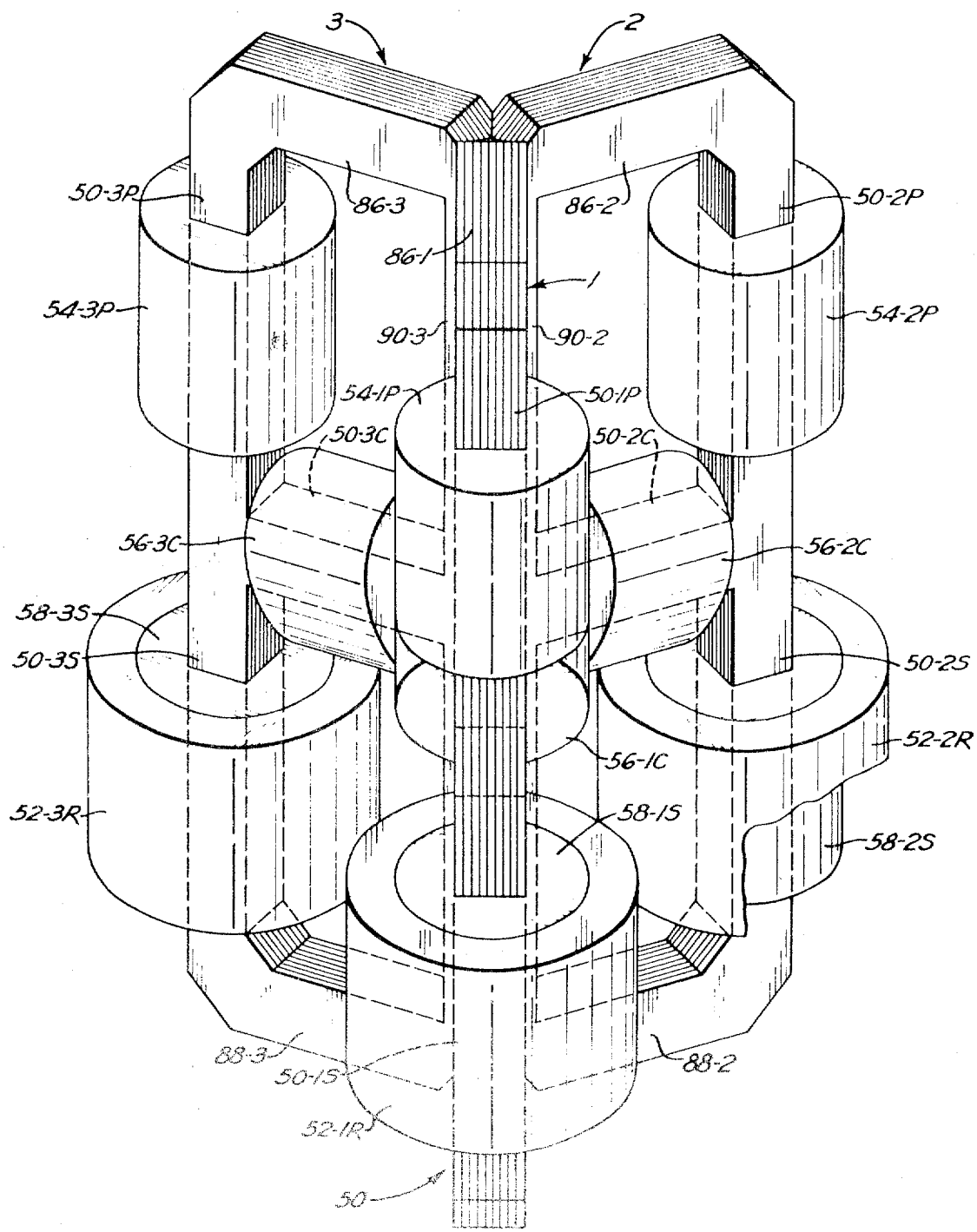
FIG. 3 is a perspective view of the improved transformer core.

Referring again to the drawing FIGS. 2 and 3, transformer portion 42 comprises a composite or multiarmed transformer core 50. As to the one phase on lines 34 and L1, core 50 comprises a primary coil arm 50–P, a secondary coil arm 50–1S, and an intermediate arm 50–1C disposed so as to control the magnetic flux flowing between the primary and secondary arms. Disposed on the primary arm is a primary coil 54–1P, and disposed on the secondary arm are a load reference coil 52–1R and a secondary coil 58–1S. A core saturation controlling, and/or transconductance controlling coil 56–1C is on arm 50–1C. The coil 58–1S supplies current to the DC portion 44 which first rectifies this current and uses it as the self-exciting current.

The coils 58 are the basis of both automatic and manual voltage regulation. The coils 58 first serve as an automatic voltage regulator in response to any load changes as detected on the 52 reference coils. The step down ratio between the primary coils 54 and the secondary coils 58 sets the initial voltage on the secondaries 58. Thereafter, the voltage on the secondary coils 58 is proportional to the voltage on the reference coils 52 which directly experience changes in load. Thus, once operation is established, automatic voltage regulation is provided by the 52 and 58 coils together, coils 52 "see" load changes, and coils 58 make appropriate adjustments to the excitation current feeding generator 14 via DC portion 44. However, the voltage on the 58 secondary coils is also proportional to the voltage on the primary 54 coils via the core 50. The relationship is utilized to provide manual control of output voltage. The control coils 56 control the saturation of the core to thus control the relationship between the 54 and 58 coils. By adjusting control portion 46, coils 56 are controlled, to thus manually control generator excitation via core 50, coils 58, and DC portion 44, as before.

The logic of the numbering of the coils and transformer arms is as follows: The first two digits indicate which coils, for instance, 50 is the core and coils 58 are the secondaries, the first digit after the dash indicates which phase, for example, the "1" indicates the first phase on line L1; and the last letter is a reminder of which coils for example, "C" indicates the control coils. The remaining coils and transformer arms are designated accordingly. Thus, coil 54–3P is a primary coil on the third phase and is associated with transformer arm 50–3P. Similarly coil 52–2R is the reference coil on the second phase, line L2, and is associated with transformer arm 50–2S. Note that control coil 56–3C and its associated transformer arm 50–3C are not shown in FIG. 2, but do appear in FIG. 3. The omission is made in FIG. 2 for drafting convenience.

Lines 34, 36 and 38 connect to one side of each of the reference coils 52, respectively, and the other end of each of the reference coils is connected to a respective output line L1, L2, and L3. Each primary coil 54 is connected by a jumper wire 60–1J, etc., to one end of each of the reference coils 52, and the opposite ends of said primary coils are tied together by a line 62 thus forming a "wye" configuration. Thus, the primary coils 54 are in parallel circuit with the load on the output lines L1, L2, and L3, and that parallel circuit is in series circuit with each of the reference coils 52. As is known, the relationship between the primary coils 54 and the secondary coils 58 is determined by the turns ratio of these two coils, with the voltage being in direct proportion to the turns ratio and the currents in inverse proportion with power being ideally unchanged.

The three control coils 56 are in a series circuit with each other provided by a pair of lines 64 and 66, with the omission of coil 56–3C in FIG. 2 being indicated by the break in the lines. The voltage adjusting portion 46, which may comprise a rheostat 68, is disposed in line 66 in the series circuit. One rheostat which may be used is commercially available from Ohmite, Spec. No. 54361.

Three lines 70, 72, and 74 interconnect transformer portion 42 to direct current portion 44, and connect the secondary coils 58 together, by means of suitable jumpers, into a "delta" configuration. The resulting delta secondary coil circuit is shown in FIG. 2a in a form in which it is more easily seen.

Referring now to the direct current portion 44, its essential elements are a rectifier 80, a battery 82, and a pushbutton starting switch 84. The rectifier may comprise an array of diodes arranged in the usual manner three phase use, as shown in the drawing, or other suitable means. Such components are commercially available from any sources and any may be used. A high quality silicone junction rectifier would also serve. Similarly, any 12 volt battery as for automotive use, and any suitable spring return normally open switch of appropriate amperage rating, may be used.

Battery 82 and push button switch 84 are in series circuit with each other in the lines 26 and 28. The lines 70, 72 and 74 connect into the rectifier 80 at different places to maintain the three-phase relationship, as is well known. The lines 28 and 66 come together at a common junction at one end of the rectifier array and lines 26 and 64 come together at the opposite end of the rectifier array so as to create two direct current circuits, one for the saturation control portion 46, and the other for initial excitation of the generator rotor 24. The three-phase rectification circuit is completed in the usual manner by two lines 81 and 83 extending from lines 26 and 28 respectively to intermediate points in the rectifier 80. The description of FIG. 2 has now been completed, and the operation thereof will be explained in the operation portion below.

An advantage of this portion of the apparatus of the invention is that the battery 82 is in use for only a few seconds during each startup. Thus, no provision need be made in the circuit for recharging the battery since it will have a long useful life before running down, after which it may be simply replaced or removed for recharging. Thus, the invention is simplified and provided with yet another economic advantage.

The core of the invention should be more efficient than the standard "H" or box structure cores due to the 120° spacing of the segments, and a more compact structure is provided.

Referring now in detail in FIG. 3, the transformer core 50 of the invention is shown in perspective view. It essentially comprises three core members or segments, one for each phase, numbered 1, 2 and 3. It will of course be understood by those skilled in the art that a composite transformer for use in a polyphase system having a different number of phases may be made up in a similar manner with an appropriate number of core segments.

Each of the core segments has the general shape of a capital letter "B." The middle cross piece comprises the arms 50–1C, etc., and the outer vertical leg is made up of the arms 50–1S, etc., and 50–1P, etc., with the coils 52, 54, 56, and 58 being shown diagrammatically mounted thereon. Each core segment is completed by an upper arm 86, a lower arm 88, and an inside vertical arm 90 interconnecting the inner ends of the arms 86, 50–C, and 88. On the drawing, the arms 86, 88, and 90 are indicated by a dash number, 1, 2 or 3 indicating the phase with which they are associated, as before. All external corners of the core may be notched or clipped if desired as shown.

Several advantages are attendant to this part of the invention. Since the fine control of output voltage is controlled solely by manual operation of rheostat 68, control may be accomplished remotely from the remainder of the installation by simply extending the lines 66. These are relatively low DC voltage, at about 10 volts. Another advantage is that the fine control may be accomplished without shutting down the machine. If conditions should change while the generator is in online service, the rheostat 68 is simply manipulated to adjust accordingly. A suitable change in core saturation occurs, output voltage is adjusted as explained above, and operation continues uninterrupted.

Another advantage of the transformer core of FIG. 3 is that it provides all the necessary voltage changes required in the entire system in one unit, in conjunction with the rectifier 80. Heretofore, it was common to have a heavy duty, high voltage transformer or transformers, and other transformers to serve the internal control circuit needs. Thus, the invention simplifies the overall circuit while reducing the amount of equipment needed, and thus provides a less expensive apparatus.

OPERATION

The operation is best explained by setting forth the manner of "starting up". The main disconnects 40 are opened to disconnect the system from the utility or power grid or other point of use. Engine 10 is brought up to approximate operating speed. Button 84 is then depressed to connect the battery, through lines 26 and 28 and slip rings 30 and 32, to the rotor 24 of the generator 14. An EMF is then induced in stator 22. This EMF passes from stator 22 along lines 34, 36, and 38 to reference coils 52. From reference coils 52, the EMF passes to main disconnect 40 via lines L1, L2, and L3. This same EMF is also fed into primary coils 54 which are connected in a "wye" configuration. This EMF in primary coils 54 induces a current, or EMF, in secondary coils 58 which are connected in a "delta" configuration for purposes of better current regulation. The EMF induced in secondary coils 58 is directly proportional to the turns ratio between primary coils 54 and secondary coils 58. The EMF induced in secondary coils 58 is carried to rectifier 28 via lines 70, 72, and 74. This three phase alternating current is then rectified to a DC voltage and is supplied to the rotor 24 via lines 26 and 28 and slip rings 30 and 32. At this point button 84 may be released. The generator 14 is now in a "self exciting state." As a point of interest, button 84 will have been depressed a total of only a few seconds between the time engine 10 is up to speed and arrival at this stage.

The generator 14 may now be synchronized with the power grid. The AC voltage on lines L1, L2, and L3 is adjusted, by rheostat 68, as explained above, to match the voltage of the power grid. Main disconnect 40 may now be closed to put generator 14 "on-line."

The function of reference coils 52 is to sustain self excitation state and to provide automatic voltage regulation. Primary coils 54 constitute a "load" on reference coils 52 and the generator 14. This "load" causes a magnetic flux field to develop in and around reference coils 52. Reference coils 52 are wound from the same size wire as the conductors, or leads, from the generator 14 and the main disconnect 40. The magnetic flux field around reference coils 52 is "cut" by the turns of secondary coils 58. This "cutting" of the flux field increases the output of the secondary coils 58 by an amount proportional to the number of turns in secondary coils 58 and the number and magnitude of the lines of force of the flux field developed in and around reference coils 52. As long as this "load" condition exists, a self-excitation state will exist.

After the main disconnect 40 is closed, the load on the generator 14 will vary according to load on the power grid. The reference coils 52 will "see," or be subject to, this same variation due to the fact that reference coils 52 are in series with the load and generator 14. This will raise and lower the excitation voltage on secondary coils 58 and this voltage will vary in direct proportion with the load. This fact is due to the mutual coupling between reference coils 52 and secondary coils 58.

For many reasons, such as balancing a plurality of generators on one parallel set of lines, to initially set the voltage, and the like, it is desirable to finely control the output voltage on lines L1, L2, and L3. Operation of rheostat 68 accomplishes this. By supplying direct current to the control coils 56 the degree of saturation of magnetic flux in the core may be raised and lowered by increasing or decreasing the amount of current passing through the coils 56. More current increases the degree of saturation of the core to thus reduce the voltage at the secondary coils 58 and at the load, as the circuit is shown. The degree of saturation of the core controls the voltage at the secondary coils, which in turn controls the voltage in the generator to thus control final output voltage.

While the invention has been described in detail above, it is to be understood that this detailed description is by way of example only, and the protection granted is to be limited only within the spirit of the invention and the scope of the following claims.

I claim:

1. A method of exciting and controlling the output voltage of an alternating current electricity generating system which utilizes a transformer having a plurality of transformer arms with a primary coils on one of said arms and a reference coil and a secondary coil mutually coupled on another of said arms, comprising the step of manually controlling the magnetic flux saturation of said transformer core between said primary coil on said one arm and said mutually coupled reference coil and secondary coil on said another arm.

2. The method of claim 1, wherein said manually controlling step is accomplished by adjusting a rheostat wired in a series circuit between a direct current portion of said system and a control coil on yet another arm of said transformer core.

3. An excitation and control system for an alternating current electricity generating machine, said machine comprising a rotatable rotor and a stator, the combination comprising a battery, means to supply direct current from said battery to said rotor to generate alternating current in said stator when said rotor rotates within said stator, a transformer having a reference coil means to supply alternating current generated in said stator to said reference coil on said transformer and to a load, a primary coil on said transformer magnetically connected to said reference coil thereon via the magnetic core of said transformer, a secondary coil on said transformer core mutually coupled to said reference coil and magnetically connected to said primary coil via said magnetic core of said transformer, circuit means including rectifying means interconnecting said secondary coil with said circuit feeding said rotor, whereby said machine achieves a self-exciting condition after operation thereof is initiated; means to control the degree of magnetic flux saturation of said transformer core between said primary coil and said secondary coil comprising a control coil operatively cooperable with said transformer core and a direct current circuit tapped into said rectifying means, and said direct current control circuit including means to manually control the current therein.

4. The combination of claim 2, said manual control means comprising a rheostat, and said direct current control circuit comprising a series circuit of said rheostat and said control coil.

5. The combination of claim 2, said electricity generating machine comprising a polyphase generator, and said transformer comprising a plurality of sets of said primary, secondary, control, and reference coils to control each of the phases individually.

6. The combination of claim 5, said transformer core comprising a plurality of transformer core segments equal to the number of phases of electricity generated, each of said segments being of the general shape of a capital letter "B" having two long arms, two short arms interconnecting the ends of the long arms, and a third short arm interconnecting the long arms intermediate their ends, said segments being joined to each other along one of their long arms respectively, one control coil being associated with said intermediate short arm of each segment, one primary coil being associated with the other of said long arms at a location thereon between said intermediate short arm and one of the end short arms of each segment, and one secondary coil and one reference coil being associated with each other and with said other long arm at a location thereon between said intermediate short arm and the other of said two end short arms of each segment.

7. The combination of claim 3, said electricity generating machine comprising a three-phase synchronous generator, and said transformer comprising three sets of said primary, secondary, control, and reference coils to control each of the three phases.

8. The combination of claim 7, said three control coils being wired in series circuit with each other in said direct current control circuit.

9. The combination of claim 8, said manual control means comprising a rheostat.

10. The combination of claim 7, said transformer core comprising three transformer core segments, each of said segments being of the general shape of a capital letter "B" having two long arms, two short arms interconnecting the ends of the long arms, and a third short arm interconnecting the long arms intermediate their ends, said segments being joined to each other along one of their long arms respectively, one control coil being associated with said intermediate short arm of each segment, one primary coil being associated with the other of said long arms at a location thereon between said intermediate short arm and one of the end short arms of each segment, and one secondary coil and one reference coil being associated with each other and with said other long arm at a location thereon between said intermediate short arm and the other of said two end short arms of each segment.

* * * * *